(12) United States Patent
Le et al.

(10) Patent No.: US 8,145,887 B2
(45) Date of Patent: *Mar. 27, 2012

(54) ENHANCED LOAD LOOKAHEAD PREFETCH IN SINGLE THREADED MODE FOR A SIMULTANEOUS MULTITHREADED MICROPROCESSOR

(75) Inventors: Hung Q. Le, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 713 days.

This patent is subject to a terminal disclaimer.

(21) Appl. No.: 11/763,760

(22) Filed: Jun. 15, 2007

(65) Prior Publication Data

US 2008/0313425 A1 Dec. 18, 2008

(51) Int. Cl.
| G06F 15/00 | (2006.01) |
| G06F 9/30 | (2006.01) |
| G06F 9/40 | (2006.01) |
| G06F 7/38 | (2006.01) |
| G06F 9/00 | (2006.01) |
| G06F 9/44 | (2006.01) |

(52) U.S. Cl. .................. 712/229; 712/207; 712/220

(58) Field of Classification Search .................. 712/207
See application file for complete search history.

(56) References Cited

U.S. PATENT DOCUMENTS

| 4,521,850 | A | * | 6/1985 | Wilhite et al. | 712/200 |
| 5,093,778 | A | * | 3/1992 | Favor et al. | 712/240 |
| 5,453,927 | A | * | 9/1995 | Matsuo | 712/235 |
| 5,913,059 | A | * | 6/1999 | Torii | 718/104 |
| 6,604,191 | B1 | * | 8/2003 | Flacks et al. | 712/207 |
| 2006/0149933 | A1 | | 7/2006 | Eickemeyer et al. | |
| 2006/0149934 | A1 | | 7/2006 | Eickemeyer et al. | |
| 2006/0149935 | A1 | | 7/2006 | Eickemeyer et al. | |
| 2007/0113056 | A1 | * | 5/2007 | Dale et al. | 712/228 |
| 2007/0204137 | A1 | * | 8/2007 | Tran | 712/214 |

OTHER PUBLICATIONS

U.S. Appl. No. 11/763,736, filed Jun. 15, 2007, Le et al.
PRD45220 Chinese Office Action dated Nov. 13, 2009, English translation of text, 10 pages.
USPTO U.S. Appl. No. 11/763,736, 1 page.
Notice of Allowance mailed Jun. 25, 2010 for U.S. Appl. No. 11/763,736; 16 pages.

* cited by examiner

*Primary Examiner* — Eddie P Chan
*Assistant Examiner* — George Giroux
(74) *Attorney, Agent, or Firm* — Francis Lammes; Stephen J. Walder, Jr.; Diana R. Gerhardt

(57) ABSTRACT

A method, system, and computer program product are provided for enhancing the execution of independent loads in a processing unit. A processing unit detects if a long-latency miss associated with a load instruction has been encountered. Responsive to a long-latency miss, the processing unit enters a load lookahead mode. Responsive to entering the load lookahead mode, the processing unit dispatches each instruction from a first set of instructions from a first buffer with an associated vector. The processing unit determines if the first set of instructions from the first buffer have completed execution. Responsive to completed execution of the first set of instructions from the first buffer, the processing unit copies the set of vectors from a first vector array to a second vector array. Then the processing unit dispatches a second set of instructions from a second buffer with an associated vector from the second vector array.

18 Claims, 10 Drawing Sheets

ENHANCED LOAD LOOKAHEAD PREFETCH IN SINGLE THREADED MODE FOR A SIMULTANEOUS MULTITHREADED MICROPROCESSOR

BACKGROUND

1. Technical Field

The present application relates generally to an improved data processing system and method. More specifically, the present application is directed to an enhanced load lookahead prefetch in single threaded mode for a simultaneous multithreaded microprocessor.

2. Description of Related Art

There is a continual desire by computer users to maximize performance and a corresponding pressure on the computer industry to increase the computing power and efficiency of microprocessors. This is especially evident in the server computer field where entire businesses are dependent on their computer infrastructure to carry out and monitor day-to-day activities that affect revenue, profit, and the like. Increased microprocessor performance will provide additional resources for computer users while providing a mechanism for computer manufacturers to distinguish themselves from the competition.

Over the years, state-of-the-art microprocessors have evolved from fairly straight forward systems to extremely complex integrated circuits having many millions of transistors on a single silicon substrate. One of the many improvements made to microprocessors is the ability of microprocessors to execute more than one instruction per cycle. This type of microprocessor is typically referred to as being "superscalar." A further performance enhancement is the ability of microprocessors to execute instructions "out of order." This out-of-order operation allows instructions having no dependencies to bypass other instructions which were waiting for certain dependencies to be resolved. The IBM® Power™ and PowerPC® series of microprocessors are examples of superscalar systems that provide out-of-order processing of instructions. Microprocessors may support varying levels of out-of-order execution support, meaning that the ability to identify and execute instructions out-of-order may be limited.

One major motivation for limiting out-of-order execution support is the enormous amount of complexity that is required to identify which instructions can execute early, and to track and store the out-of-order results. Additional complexities arise when the instructions executed out-of-order are determined to be incorrect per the in-order execution model, requiring their execution to not impact the architected state of the processor when an older instruction causes an exception. As processor speeds continue to increase, it becomes more attractive to eliminate some of the complexities associated with out-of-order execution. This will eliminate logic and the logic's corresponding chip area, or "real estate", from the chip which is normally used to track out-of-order instructions, thereby allowing additional "real estate" to become available for use by other processing functions.

As known in the art, there are certain conditions that occur when instructions are executed by a microprocessor that will cause a stall to occur where instruction execution is limited or halted until that condition is resolved. One example is a cache miss which occurs when data required by an instruction is not available in a level one (L1) cache and the microprocessor is forced to wait until the data can be retrieved from a slower cache or main memory. Obtaining data from main memory is a relatively slow operation and, when out-of-order execution is limited due to aforementioned complexities, subsequent instructions cannot be fully executed until valid data is received from memory.

More particularly, an older instruction that takes a long time to execute can create a stall that may prevent any younger or subsequent instructions from executing until the time consuming instruction completes. For example, in the case of a load instruction that requires access to data not in the L1 cache (cache miss), a prolonged stall can occur while data is fetched from a slower cache or main memory. Without facilities to support all out-of-order execution scenarios, it may not be possible to change instruction ordering such that forward progress through the instruction stream can be made while the missed data is retrieved.

SUMMARY

The illustrative embodiments provide for implementing the prefetch mechanism that provides for a deeper reach into the instruction cache for more instructions. In one embodiment, the described prefetch assist mechanism takes advantage of a normally unused instruction buffer, which occurs in single threaded mode, to increase the capacity of instructions that may be fetched for a single thread and to increase the number of load instructions that may be prefetched. The prefetch mechanism, in this embodiment uses both instruction buffers to send instructions to the execution units in load lookahead (LLA) mode under single threaded mode.

In another embodiment, the prefetch mechanism uses the instruction buffer of both threads in single threaded mode to increase the capacity of instructions that may be fetched. Using both instruction buffers increases the instruction fetch bandwidth and performance significantly without adding more silicon. Additionally, the architected resources from both threads are also working together to increase result capacity.

The described prefetch mechanisms, described in the illustrative embodiments, provide an improvement over known systems by increasing single thread performance without adding significant silicon. By increasing performance without adding significant silicon, power is saved and the frequency of the processor is improved. For example, in order to double the depth of an instruction buffer, up to two times more silicon may be required, more power may be consumed, and read commands may take longer to execute.

The illustrative embodiments provide for enhancing the execution of independent loads in a processing unit. The illustrative embodiments detect if a long-latency miss associated with a load instruction has been encountered. The illustrative embodiments enter a load lookahead mode in the processing unit in response to the encounter of the long-latency miss. The illustrative embodiments dispatch each instruction from a first set of instructions from a first buffer with an associated vector in response to entering the load lookahead mode. The associated vector is within a set of vectors in a first vector array. The illustrative embodiments determine if the first set of instructions from the first buffer have completed execution. The illustrative embodiments copy the set of vectors from the first vector array to a second vector array in response to completed execution of the first set of instructions from the first buffer. Then, the illustrative embodiments dispatch a second set of instructions from a second buffer with an associated vector from the second vector array.

In the illustrative embodiments, the first buffer and the first vector array are associated with a first thread, the second buffer and the second vector array are associated with a second thread, and the first set of instructions and the second set of instructions are associated with the first thread.

Further illustrative embodiments receive a set of updated results from the execution of the first set of instructions. The illustrative embodiments update a register entry within a set of entries in a first register that is associated with each instruction in the first set of instructions. The illustrative embodiments copy the set of entries from the first register to a second register in response to the completed execution of the first set of instructions from the first buffer. The illustrative embodiments update the register entry within the set of entries in the second register that is associated with each executed instruction in the second set of instructions. In the illustrative embodiments, the set of entries from the first register are copied to the second register using a copy_unconditional signal.

Other illustrative embodiments fetch additional instructions into the first buffer in order until the first buffer is full in response to entering the load lookahead mode. The illustrative embodiments fetch the additional instructions into the second buffer in order until the second buffer is full in response to filling the first buffer. The illustrative embodiments stop the fetch of the additional instructions in response to filling the second buffer.

In the illustrative embodiments the processing unit is operating in a single threaded mode. In executing the single threaded mode, further illustrative embodiments determine if a mode bit is set that indicates an initiation of the single threaded mode. The illustrative embodiments initiate the single threaded mode in response to the mode bit being set. The illustrative embodiments clear the contents of the first buffer, the second buffer, the first vector array, the second vector array, a first register, and a second register. Then, the illustrative embodiments fetch instructions into the first buffer.

Other illustrative embodiments determine if the load lookahead mode has been exited. The illustrative embodiments discard contents of the second buffer, the first vector array, the second vector array, and a second register in response to the exit of the load lookahead mode.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
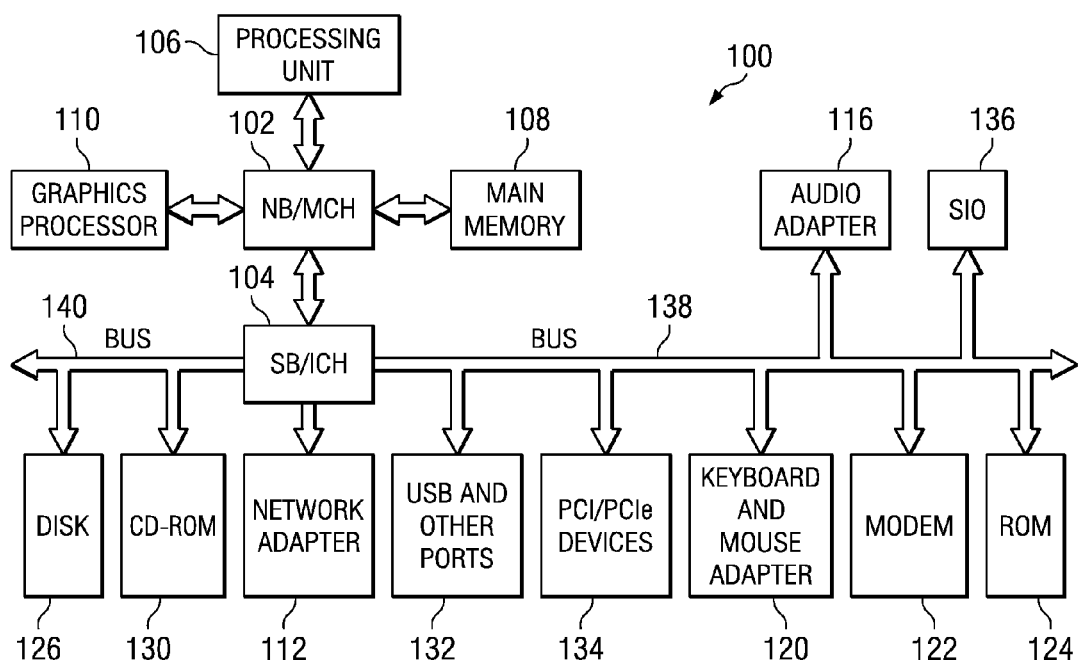
FIG. 1 is a block diagram of an exemplary data processing system in which aspects of the illustrative embodiments may be implemented.

The illustrative embodiments provide for a prefetch assist mechanism that enhances the execution of independent loads in a single threaded assist mode. With the illustrative embodiments, a data processing system provides a method to enhance the execution of independent loads in single threaded mode. FIG. 1 is provided as an exemplary data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

The illustrative embodiments provide for implementing the prefetch mechanism that provides for a deeper reach into the instruction cache for more instructions. In one embodiment, the described prefetch assist mechanism takes advantage of a normally unused instruction buffer, which occurs in single threaded mode, to increase the capacity of instructions that may be fetched for a single thread and to increase the number of load instructions that may be prefetched. The prefetch mechanism, in this embodiment uses both instruction buffers to send instructions to the execution units in LLA mode under single threaded mode.

In another embodiment, the prefetch mechanism uses the instruction buffer of both threads in single threaded mode to increase the capacity of instructions that may be fetched. Using both instruction buffers increases the instruction fetch bandwidth and performance significantly without adding more silicon. Additionally, the architected resources from both threads are also working together to increase result capacity.

The described prefetch mechanisms, described in the illustrative embodiments, provide an improvement over known systems by increasing single thread performance without adding significant silicon. By increasing performance without adding significant silicon, power is saved and the frequency of the processor is improved. For example, in order to double the depth of an instruction buffer, up to two times more silicon may be required, more power may be consumed, and read commands may take longer to execute.

Figure 2:
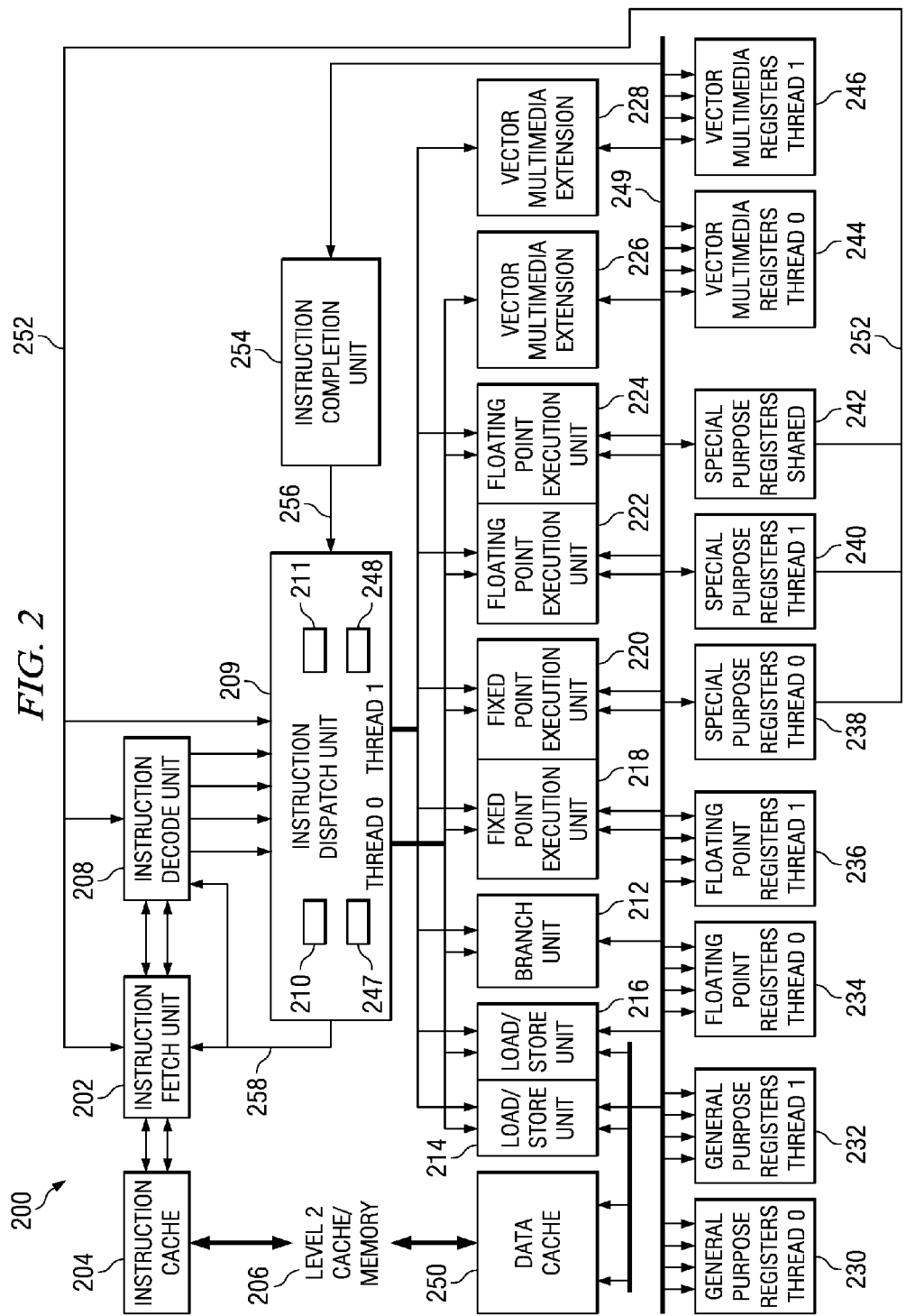
FIG. 2 depicts an exemplary block diagram of a conventional dual threaded processor design showing functional units and registers in accordance with an illustrative embodiment.

Referring to FIG. 2, an exemplary block diagram of a conventional dual threaded processor design showing functional units and registers is depicted in accordance with an illustrative embodiment. Processor 200 may be implemented as processing unit 106 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 can request multiple instructions from instruction cache 204 for up to two threads at the same time. Instruction decode unit 208 decodes multiple instructions for up to two threads at the same time and passes decoded instructions to instruction dispatch unit (IDU) 209.

IDU 209 includes a 64 entry instruction buffer (IBUF), IBUF0 210 and IBUF1 211, which receive the decoded instructions from instruction decode unit 208. Instructions are stored in IBUF0 210 and IBUF1 211 while awaiting dispatch to the appropriate execution units. IDU 209 selectively groups decoded instructions stored in IBUF0 210 and IBUF1 211 for each thread, and outputs or issues a group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

Dirty_bit vectors 247 and 248 in IDU 209 include 32 bits each, one of which corresponds to each of the 32 architected general purpose registers in each of GPRs 230 and 232 in the processor 200. It should be understood that GPRs 230 and 232, each having 32 entries, are used merely as an example and should not be considered a limitation. Those skilled in the art will readily comprehend how GPRs 230 and 232, as well as other types of architected facilities, such as FPRs 234 and 236 of other sizes, such as 8, 16, 64, 128, or the like, are contemplated by the scope of the illustrative embodiments. The bits in dirty_bit vectors 247 and 248 indicate which results in the GPRs 230 and 232 have valid or invalid results. In a preferred embodiment a "0" is set in dirty_bit vectors 247 and 248 for those registers having valid results and a "1" is set in dirty_bit vectors 247 and 248 for those registers having invalid results. Dirty_bit vectors 247 and 248 will be described in more detail below.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, IDU 209 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

IDU 209 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed point arithmetic, two load/store, two floating point arithmetic or two vector multimedia extension, and one branch), and up to five instructions may belong to the same thread. IDU 209 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 209 dispatches either FPU instructions 222 and 224 or VMX instructions 226 and 228 in the same group with FXU instructions 218 and 220. That is, IDU 209 does not dispatch FPU instructions 222 and 224 and VMX instructions 226 and 228 in the same group. Program states, such as an instruction pointer, stack pointer, or processor status word, stored in SPRs 238 and 240 indicate thread priority 252 to IDU 209.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to IDU 209 to notify IDU 209 that more groups of instructions can be dispatched to execution units 212, 214, 216, 218, 220, 222, 224, 226, and 228. IDU 209 sends dispatch signal 258, which serves as a throttle to bring more instructions down the pipeline to the dispatch unit, to IFU 202 and instruction decode unit 208 to indicate that it is ready to receive more decoded instructions.

Figure 3:
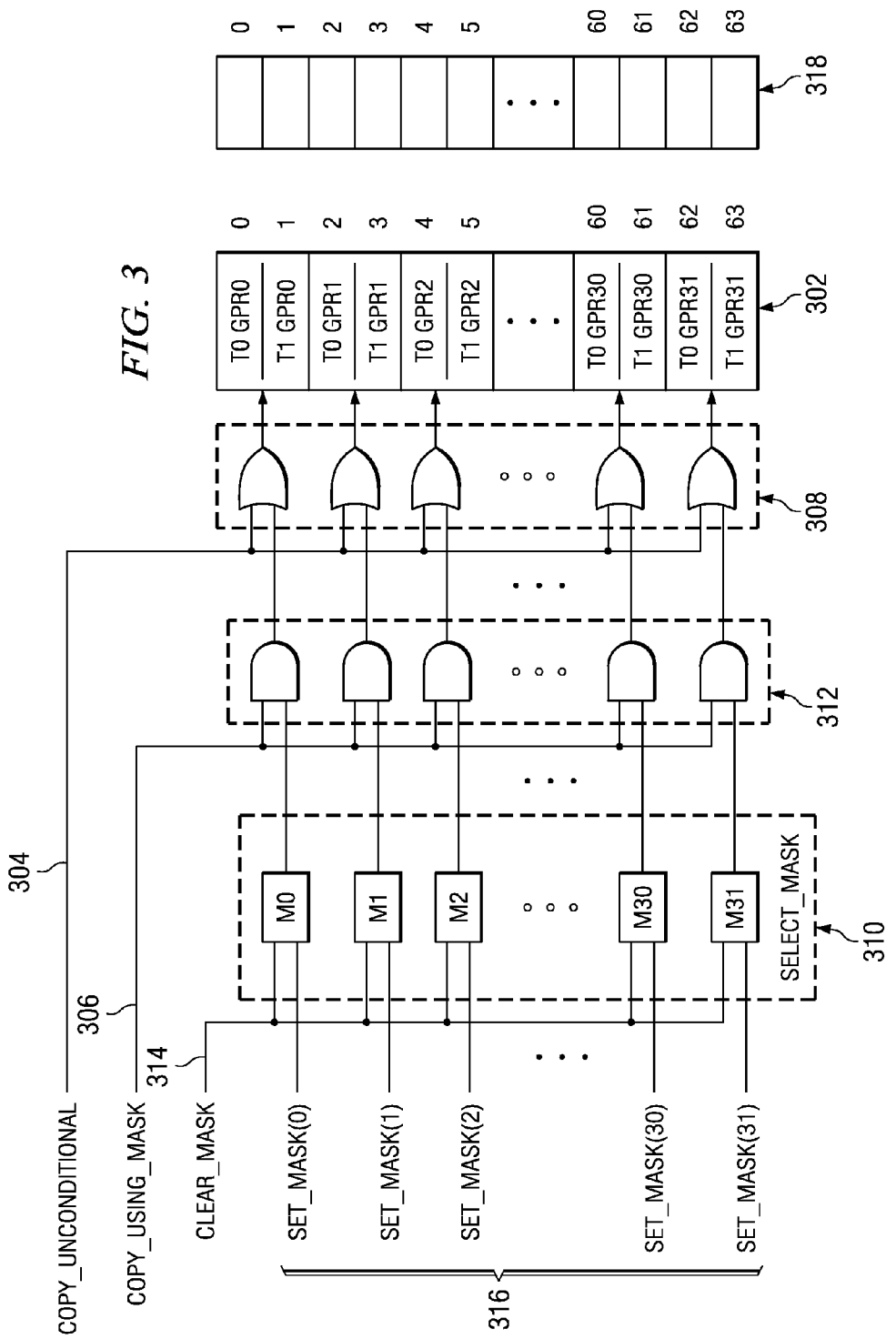
FIG. 3 depicts a general purpose register in accordance with the illustrative embodiment.

In order to implement an enhancement of the execution of independent loads in a single threaded mode, a brief discussion of the facilities used to control a general purpose register is provided in accordance with an illustrative embodiment. FIG. 3 depicts such a general purpose register in accordance with the illustrative embodiment. General purpose register (GPR) 302 is similar to GPRs 230 and 232 of FIG. 2. However, GPR 302 is implemented as one 64 bit entry register file, where two threads, thread 0 and thread 1, are interleaved such that GPRs of thread 0 occupy the even entries of GPR 302 and GPRs of thread 1 occupy the odd entries of GPR 302. On the contrary, GPRs 230 and 232 of FIG. 2 are implemented as two separate 32 bit entry register files. Interleaved GPR 302 provides support out-of-order execution instructions, such that instruction ordering changes to allow forward progress through the instruction stream while missed data is retrieved. When GPR 302 is interleaved in the above described manner, copying the content from the GPR entries of one thread to the GPR entries of another thread may be performed in one clock cycle. For example, all 32 entries of one thread may be copied to the 32 entries of the other thread simultaneously since each register pair is located next to each other. If, however, the two GPRs are separate, as in the case of GPRs 230 and 232 of FIG. 2, then copying the content of a first GPR to a second GPR is more problematic as more write ports are needed to transfer data from the first GPR to the second GPR. Separate GPRs, also involve numerous wires, thus the number of GPR register transfers per cycle is limited. That is, to transfer all the contents in 32 entries of a first GPR to a second GPR will require more than one clock cycle to complete.

In GPR 302, GPR0 of thread 0 is in location 0, and GPR0 of thread 1 is in location 1, GPR1 of thread 0 is in location 2, and GPR1 of thread 1 is in location 3, etc. A processor, such as processor 200 of FIG. 2 may generate control signals to activate various modes of enhancement. For example, the processor may generate signals to activate a copy of contents between GPR0 and GPR1 in GPR 302. That is, when the processor detects that it can enter the LLA mode, and the processor is also in a single threaded mode, the processor may generate a signal to initiate the copy of contents between GPR0 and GPR1. When the processor detects that it may operate without the LLA mode, and the processor is also in a single threaded mode, the processor may generate a signal to initiate the copy of contents selectively between GPR0 and GPR1 by asserting a copy_using_mask signal. Thus, the processor controls the copying of the content of the entries in GPR 302 using two signals, copy_unconditional signal 304 or copy_using_mask signal 306 through OR gates 308. When the processor asserts copy_unconditional signal 304, the content of the entries for thread 1 are copied to the entries for thread 0 in one clock cycle. When the processor asserts copy_using_mask signal 306, the content of entries for thread 0 are copied to the entries for thread 1 selectively as specified by a corresponding active bit of select_mask register 310 through AND gates 312.

Select_mask register 310 is a 32 bit register where each bit of select_mask register 310 controls the copying of the corresponding GPR entry from thread to thread depending on whether the bit is active or not. For example, if bit M2 of select_mask register 310 is active when the processor asserts copy_using_mask signal 306, the entry in T0 GPR2 is copied to T1 GPR2. Select_mask register 310 is controlled by clear_mask signal 314 and thirty-two set_mask signals 316, labeled set_mask(0) thru set_mask(31). When the processor asserts clear_mask signal 314 then all 32 bits of select_mask register 310 are set to an inactive state. If the processor asserts any one of the thirty-two set_mask signals 316, then the corresponding select_mask register 310 is set active.

Also associated with GPR 302 is dirty_bit vector array 318 with its relationship to GPR 302. Each of the 64 bits in dirty_bit vector array 318 represent the 64 entries in GPR 302, that is, bits 0-63 in dirty_bit vector array 318 directly correspond to registers 0-63 in GPR 302. However, dirty_bit vector array 318 is implemented as one 64 bit entry register file, where two threads, thread 0 and thread 1, are interleaved such that dirty_bit vectors of thread 0 occupy the even entries of dirty_bit vector array 318 and dirty_bit vectors of thread 1 occupy the odd entries of dirty_bit vector array 318. Dirty_bit vectors 247 and 248 of FIG. 2 are implemented as two separate 32 bit entry register files. For purposes of explanation and not limitation, dirty_bit vector array 318 is described herein as being associated with GPR 302. It should be understood that other illustrative embodiments are contemplated in which dirty_bit vector array 318 may be associated with other registers, such as floating point registers 234 and 236 of FIG. 2, special purpose registers 238 and 240 of FIG. 2, or the like.

Figure 4:
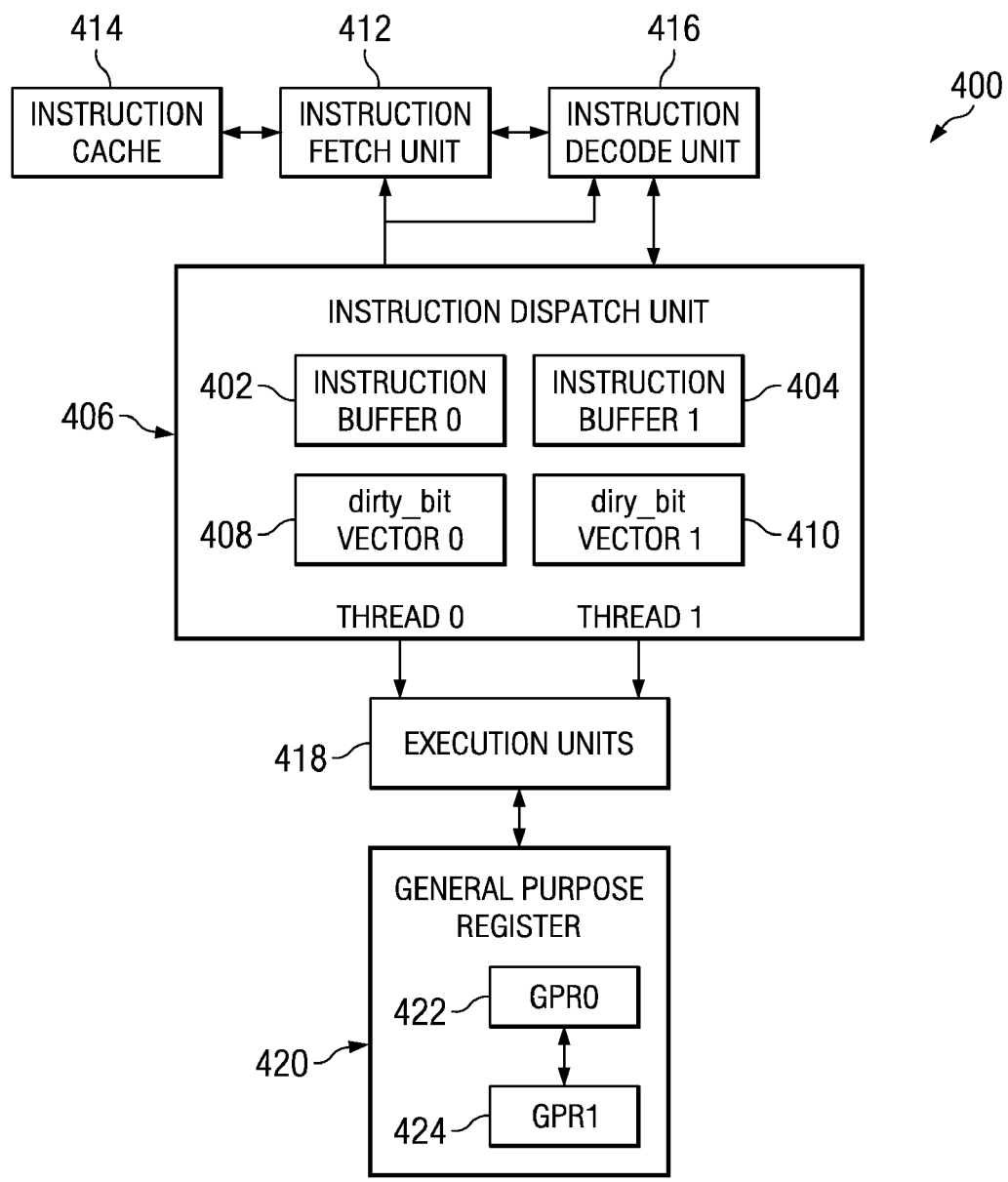
FIG. 4 is a functional block diagram of a prefetch assist mechanism that enhances the execution of independent loads under load lookahead (LLA) in accordance with an illustrative embodiment.

FIG. 4 is a functional block diagram of a prefetch assist mechanism that enhances the execution of independent loads under load lookahead (LLA) in accordance with an illustrative embodiment. The prefetch assist mechanism may be implemented in processor 400, similar to processor 200 of FIG. 2. When an application, executed by processor 400, requests that processor 400 switch from a simultaneous multithreaded (SMT) mode to a single threaded mode, the application may set a mode bit that tells processor 400 to initiate single threaded mode. Hardware within processor 400 continually or periodically examines the mode bit, so that, when the mode bit is set, processor 400 will initiate the single threaded mode and behave accordingly. At this point processor 400 clears any content out of both instruction buffer 0 (IBUF0) 402 and instruction buffer 1 (IBUF1) 404, which are similar to IBUF0 210 and IBUF1 211 of FIG. 2. IBUF0 402 and IBUF1 404 are within instruction dispatch unit (IDU) 406, which is similar to IDU 209 of FIG. 2. Additionally, upon entering single threaded mode, processor 400 clears out any content in dirty_bit vector array 0 408 and dirty_bit vector array 1 410.

In single threaded mode, instruction fetch unit (IFU) 412 fetches instructions from instruction cache 414 according to an instruction address, and passes instructions to instruction decode unit 416. Instruction decode unit 416 decodes multiple instructions and passes the decoded instructions to IBUF0 402 in IDU 406. In a normal execution mode, execution units 418 executes instructions that are dispatched by IDU 406 from IBUF0 402 in order. Execution units 418 write the results of the instruction execution into GPR0 entries 422 of general purpose register (GPR) 420 then processor 400 deallocates the instructions from IBUF0 402. Once instructions are deallocated from IBUF0 402, instruction decode unit 416 may decode subsequent instructions and pass the decoded instructions to IBUF0 402 to allocate a deallocated entry of IBUF0 402 in order.

If during dispatch, processor 400 encounters a long-latency miss, such as level 2 (L2) cache miss, a translation miss, or the like, then processor 400 enters LLA mode. In LLA mode, instruction decode unit 416 continues to pass instructions to IBUF0 402 until it is full. When IBUF0 402 is full, then the instruction decode unit 416 passes the decoded instructions to IBUF1 404 in IDU 406. Processor 400 does not deallocate any instructions from IBUF0 402 while under LLA mode. That is, once LLA mode is exited, the load instructions that caused the long-latency miss and all instructions younger than that load will have to be re-dispatched and re-executed. Thus, instructions in IBUF0 402 are older than instructions in IBUF1 404. When IBUF1 404 is full, IFU 412 stops fetching instructions until the LLA mode is exited. IFU 412 stops fetching because, when processor 400 exits LLA mode, processor 400 will discard all instructions in IBUF1 404 and resume dispatching from IBUF0 402.

In LLA mode, execution units 418 execute instructions in IBUF0 402 without changing the architected state of the machine and the load/store unit performs prefetch requests for independent load instructions. Once LLA mode is entered, processor 400 does not write back instructions that have passed the write back stage and results from executing the instructions once LLA mode is entered are prevented from being written into GPR 420. Processor 400 marks all instructions after the write back stage as dirty by updating the associated dirty_bit vector in dirty_bit vector 0 array 408. In LLA mode, IDU 406 dispatches all instructions from IBUF0 402 with an associated dirty_bit vector from dirty_bit vector 0 array 408, which indicates that the instruction should be treated as dirty, if the associated dirty_bit is a 1.

When all instructions from IBUF0 402 have been dispatched, processor 400 waits until all instructions from IBUF0 402 have executed and dirty_bit vector 0 array 408 has been updated. Processor 400 copies the dirty_bit vectors from dirty_bit vector 0 array 408 to dirty_bit vector 1 array 410. Then, processor 400 copies the content of GPR0 entries 422 into GPR1 entries 424 by asserting the copy_unconditional signal for one cycle as described with respect to copy_unconditional signal 304 to FIG. 3. Once the content of GPR0 entries 422 have been copied into GPR1 entries 424, IDU 406 begins to dispatch instructions from IBUF1 404 to execution units 418. Again, processor 400 does not write back instructions that are not supported by the out-of-order execution mechanisms of processor 400, that is, these instructions have passed the write back stage and results from executing the instructions once LLA mode is entered are prevented from being written into GPR 420. Processor 400 marks all instructions after the write back stage as dirty by updating the associated dirty_bit vector 1 array 410. IDU 406 dispatches all instructions with the associated dirty_bit vector of dirty_bit vector 1 array 410, under the LLA mode, which indicates that the instruction should be treated as dirty.

When the long-latency miss data is returned to the processor, processor 400 exits LLA mode and discards all instructions from IBUF1 404. The discarded instructions may be prefetched into IBUF0 402 at a later time when IBUF0 402 starts draining during normal execution mode. Processor 400 also clears all of the dirty_bits vectors from dirty_bit vector 0 array 408 to dirty_bit vector 1 array 410 when processor 400 exits LLA mode. Additionally, processor 400 discards all contents from GPR1 entries 424 as the contents of GPR1 entries 424 are not allowed to copy back into GPR0 entries 422. The contents of GPR1 entries 424 are only needed to assist prefetching in LLA mode. Processor 400 does not clear the content in GPR0 entries 422 since the content contains the latest architected data prior to entering the LLA mode. Then, IDU 406 begins to dispatch instructions from IBUF0 402 to execution units 418 in a normal execution mode.

Thus, implementing the prefetch mechanism, as described in FIG. 4, provides for a deeper reach into the instruction cache for more instructions. The described prefetch assist mechanism takes advantage of a normally unused instruction buffer, which occurs in single threaded mode, to increase the capacity of instructions that may be fetched for a single thread and to increase the number of load instructions that may be prefetched. The prefetch mechanism uses both instruction buffers to send instructions to the execution units in LLA mode under single threaded mode. The described prefetch mechanism provides an improvement over known systems by increasing single thread performance without adding significant silicon. By increasing performance without adding significant silicon, power is saved and the frequency of the processor is improved. For example, if IBUF0 402 is double in depth to 128 entries, IBUF0 402 may use up to two times the amount of silicon, consume more power, and takes longer to read, i.e. processor operating frequency will decrease accordingly.

Figure 5:
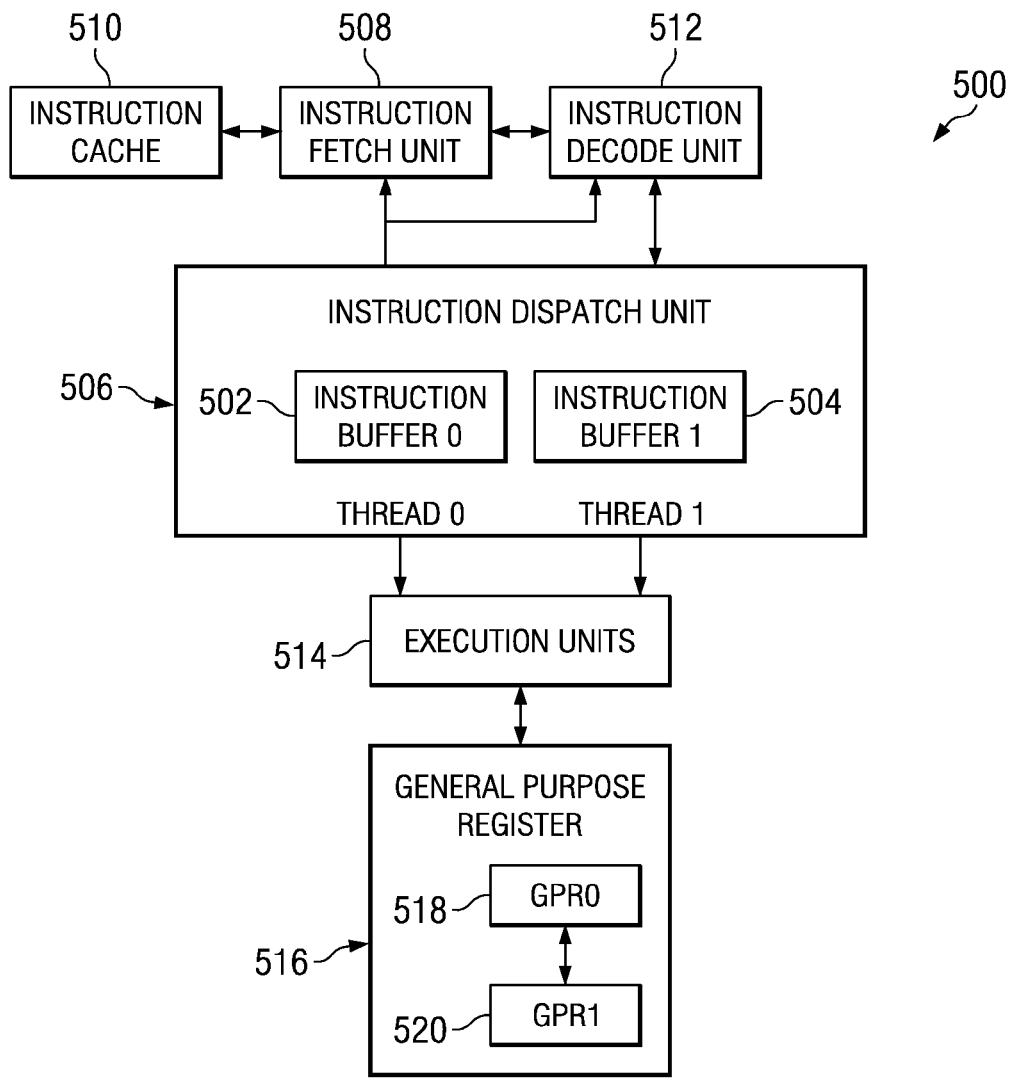
FIG. 5 is a functional block diagram of a prefetch assist mechanism that enhances the execution of independent loads in a single threaded assist mode without using load lookahead (LLA) in accordance with an illustrative embodiment.

FIG. 5 is a functional block diagram of a prefetch assist mechanism that enhances the execution of independent loads in a single threaded assist mode without using load lookahead (LLA) in accordance with an illustrative embodiment. The initial process performed by processor 500 is similar to the initial process performed by processor 400 of FIG. 4. In that processor 500 initiates a single threaded mode by continually or periodically examining a mode bit and clears any content out of both instruction buffer 0 (IBUF0) 502 and instruction buffer 1 (IBUF1) 504, which are within instruction dispatch unit (IDU) 506. The initial process is also similar to that described in FIG. 4, in that instruction fetch unit (IFU) 508 fetches instructions from instruction cache 510 and passes the instructions to instruction decode unit 512, where instruction decode unit 512 decodes the instructions and passes the decoded instructions to IBUF0 502 in IDU 506.

However, in this illustrative embodiment, when IBUF0 502 is full, instruction decode unit 512 passes the decoded instructions to IBUF1 504 in IDU 506. Instructions in IBUF0 502 are older than instructions in IBUF1 504. As instruction decode unit 512 passes the first instruction to IBUF1 504 after IBUF0 502 is full, control circuitry associated with IBUF1 504 sets a first_bit of the first instruction fetched into IBUF1 504 to a 1. Setting the first_bit of the first instruction to a 1 is performed to indicate that this instruction and any younger instructions in IBUF1 504 must wait until IBUF0 502 has dispatched all of its instructions to execution units 514. Once IDU 506 dispatches the first instruction in IBUF1 504, the first_bit disappears as the instruction is dispatched to execution unit 514. Then, when IBUF1 504 is full again, IFU 508 stops fetching if IBUF0 502 is also full. If when IBUF1 504 is full and IBUF0 502 is not full because IBUF0 502 is being drained by instructions being dispatched by IDU 506 to execution units 514, then IFU 508 fetches instructions from instruction cache 510 through instruction decode unit 512 into IBUF0 502 using the same method as described above with respect to IBUF1 504. When instructions in IBUF1 504 became older than instructions in IBUF0 502, such as when IBUF1 504 is dispatching and IBUF0 502 first instruction now has a first_bit active, instructions in IBUF0 502 will have to wait until all instructions in IBUF1 504 have been dispatched.

Using the first_bit ensures that all instructions are in order across both IBUF0 502 and IBUF1 504. As described above, IDU 506 dispatches instructions in order to executions units 514 from IBUF0 502 and IBUF1 504 using the first_bit. Thus, instructions in IBUF1 504 wait until all instructions from IBUF0 502 have been dispatched when IDU 506 is dispatching from IBUF0 502 and instructions in IBUF0 502 wait until all instructions from IBUF1 504 have been dispatched when IDU 506 is dispatching from IBUF1 504.

When the instructions that are dispatched by IDU 506 from IBUF0 502 are executed by executions units 514, execution units 514 write the results of the instruction execution into GPR0 entries 518 of general purpose register (GPR) 516. When all instructions from IBUF0 502 have been dispatched, processor 500 waits until all instructions from IBUF0 502 have executed and GPR0 entries 518 are updated. Then, processor 500 copies the content of GPR0 entries 518 into GPR1 entries 520 by asserting the copy_unconditional signal for one cycle as described with respect to copy_unconditional signal 304 of FIG. 3. Once processor 500 copies the content of GPR0 entries 518 into GPR1 entries 520, IDU 506 begins to dispatch instructions from IBUF1 504 to execution units 514. Execution units 514 then write the results of the instruction execution into GPR1 entries 520 of general purpose register 516. When updated results are written back to GPR1 entries 520, processor 500 sets the corresponding select_mask bit of a select_mask register, such as select_mask register 310 of FIG. 3, in GPR 516 using a field, such as a write_back_register_transfer (RT) field or the like, to assert the corresponding set_mask signal, such as set_mask signals 316 of FIG. 3. The assertion of one of the set_mask signals is then used by processor 500 in setting the corresponding bit in the select_mask register to an active state.

Once IDU 506 has dispatched the last of the in-order instructions from IBUF1 504, processor 500 copies the content of GPR1 entries 520 that were updated by the execution of the instructions from IBUF1 504 to GPR0 entries 518 using the asserted ones of bits in the select_mask register. Copying of updated content from GPR1 entries 520 to GPR0 entries 518 is performed by processor 500 activating a copy_using_mask signal, such as copy_using_mask signal 306 of FIG. 3. When processor 500 asserts the copy_using_mask signal, processor 500 copies all of GPR1 entries 520 that have a corresponding select_mask register bit asserted to the corresponding GPR0 entries 518. Thus, GPR0 entries 518 now contains all the latest updates from the execution of instructions from IBUF1 504. Once the content of GPR1 entries 520 have been copied into GPR0 entries 518, processor 500 asserts a clear_mask signal to clear all bits in the select_mask register and IDU 506 begins to dispatch instructions from IBUF0 502 to execution units 514 in the manner described above.

Thus, implementing the prefetch mechanism, as described in FIG. 5, provides for an increase in the capacity of instructions that may be fetched in a single threaded mode. The described prefetch mechanism uses the instruction buffer of both threads in single threaded mode to increase the capacity of instructions that may be fetched. Using both instruction buffers increases the instruction fetch bandwidth and performance significantly without adding more silicon. Additionally, the architected resources from both threads are also working together to increase result capacity. The described prefetch mechanism provides an improvement over known systems by increasing single thread performance without adding significant silicon. By increasing performance without adding significant silicon, power is saved and the frequency of the processor is improved. For example, if IBUF0 502 is double in depth to 128 entries, IBUF0 502 may use up to two times the amount of silicon, consume more power, and takes longer to read, i.e. processor operating frequency will decrease accordingly.

Figure 6A:
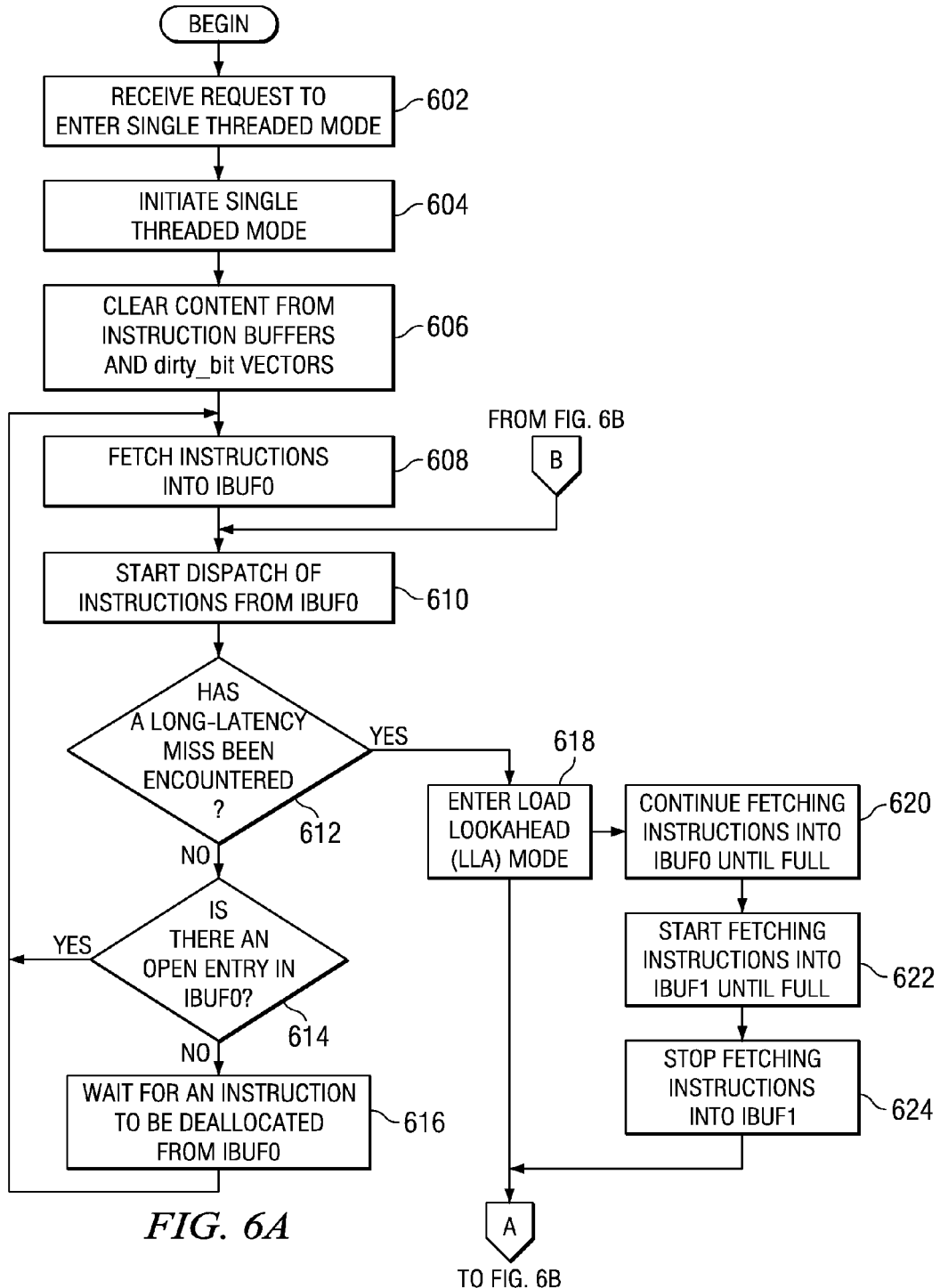
FIGS. 6A and 6B depict a flowchart outlining an exemplary operation for a prefetch assist mechanism that enhances the execution of independent loads under load lookahead (LLA) in accordance with an illustrative embodiment.
Figure 6B:
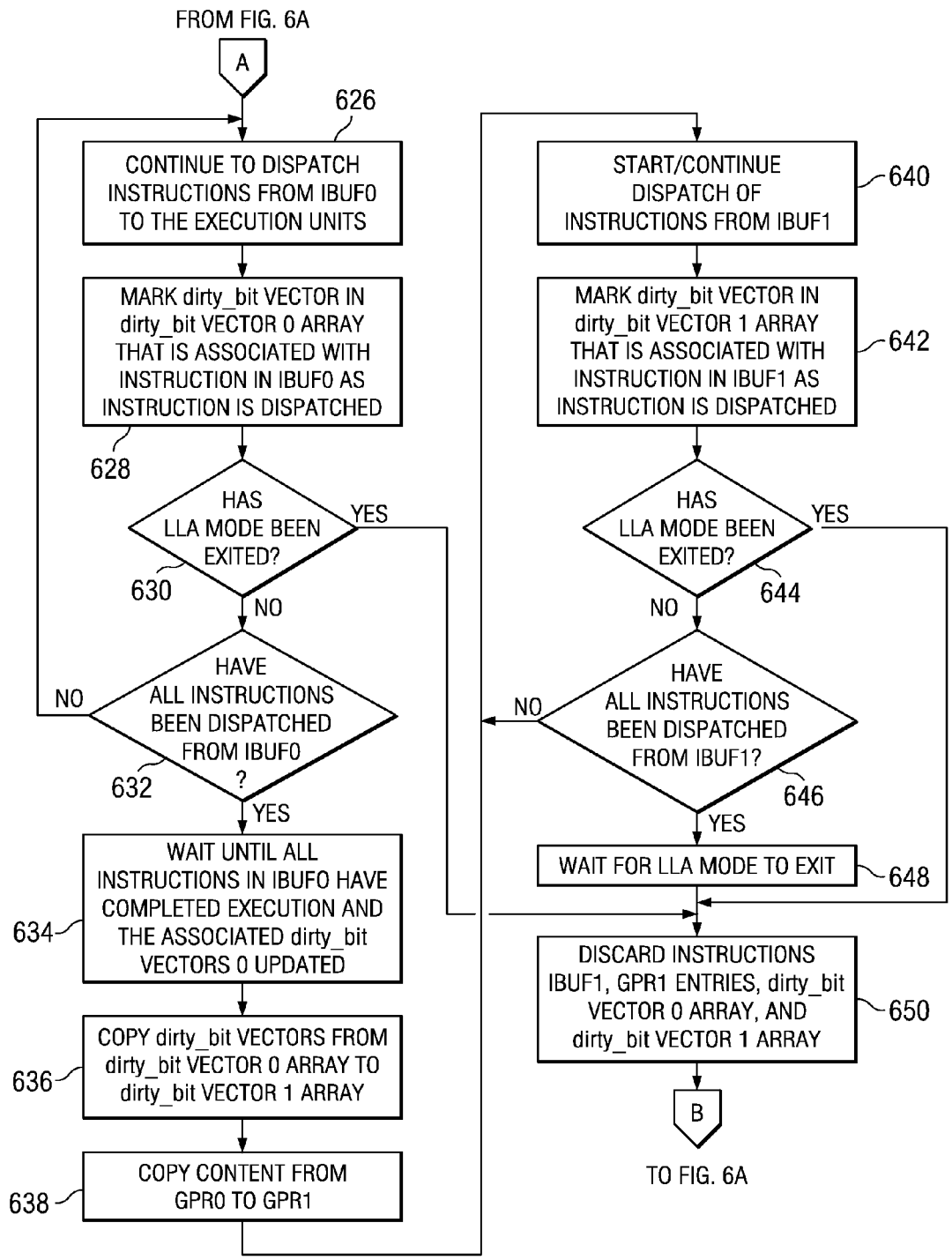

FIGS. 6A and 6B depict a flowchart outlining an exemplary operation for a prefetch assist mechanism that enhances the execution of independent loads under load lookahead (LLA) in accordance with an illustrative embodiment. The exemplary operation is performed by a prefetch assist mechanism that is implemented in a processor, such as processor 400 of FIG. 4. As the operation begins, the processor receives a request to enter a single threaded mode (step 602). The processor initiates the single threaded mode and behaves accordingly (step 604). At this point the processor clears any content out of the instruction buffers (IBUF), such as IBUF0 402 and IBUF1 404 of FIG. 4, and clears out any content in dirty_bit vector arrays, such as dirty_bit vector 0 array 408 and dirty_bit vector array 1 410 of FIG. 4 (step 606).

Once in the single threaded mode, an instruction fetch unit (IFU), such as IFU 412 of FIG. 4, fetches instructions from an instruction cache, such as instruction cache 414 of FIG. 4, into IBUF0 (step 608). In a normal execution mode, an instruction dispatch unit (IDU), such as IDU 406 of FIG. 4, dispatches instructions in order from IBUF0 to execution units, such as execution units 418 of FIG. 4 (step 610). During the execution of the instructions, the execution units write the results of the instruction execution into GPR0 entries of a general purpose register (GPR), such as GPR0 entries 422 of GPR 420 of FIG. 4. Also during the execution of instructions, the processor determines if a long-latency miss has been encountered (step 612). If at step 612 the processor fails to detect a long-latency miss, the processor determines if there is an open entry in IBUF0 due to the completion of an instruction and its deallocation (step 614). If at step 614 there is a deallocated entry in IBUF0, the operation returns to step 608. If at step 614, there is not a deallocated entry in IBUF0, the processor waits until an instruction completes and the associate entry is deallocated from IBUF0 (step 616), with the operation returning to step 608 thereafter.

Returning to step 612, if the processor detects a long-latency miss, then the processor enters LLA mode (step 618). At this point, the operation may perform two simultaneous functions. First, the IFU continues to fetch into IBUF0 until it is full (step 620). When IBUF0 is full, the IFU will start fetching into IBUF1 (step 622). The processor does not deallocate any instructions from IBUF0 while under LLA mode. That is, once LLA mode is exited, the load instructions that caused the long-latency miss and all instructions younger than that load will have to be re-dispatched and re-executed. When the IFU determines IBUF1 to be full, the IFU stops fetching instructions until the LLA mode is exited (step 624), with the operation continuing to step 626. The IFU stops fetching because, when the processor exits LLA mode, the processor will discard all instructions in IBUF1 and resume dispatching from IBUF0.

In the second operation from step 618, the IDU continues to dispatch instructions from IBUF0 (step 626). In LLA mode, the execution units may execute instructions from IBUF0 without changing the architected state of the machine. Once LLA mode is entered, the processor does not write back instructions that have passed the write back stage and results from executing the instructions once LLA mode is entered are prevented from being written into the GPR. The processor marks all instructions after the write back stage as dirty by updating the associated dirty_bit vector in the dirty_bit vector 0 array for instructions from IBUF0 (step 628). In LLA mode, the IDU dispatches all instructions from IBUF0 with the associated dirty_bit vector from the dirty_bit vector 0 array, which indicates that the instruction should be treated as dirty, if the associated dirty_bit is a 1.

The processor then determines if the LLA mode has been exited (step 630). If at step 630 the LLA mode has not been exited, the IDU determines if all of the instructions have been dispatched from IBUF0 (step 632). If at step 632 all of the instructions have not been dispatched, the operation returns to step 626. If at step 632 all instructions from IBUF0 have been dispatched, the processor waits until all instruction from IBUF0 have executed and the dirty_bit vector 0 array has been updated (step 634). Then, the processor copies the dirty_bit vectors from the dirty_bit vector 0 array to the dirty_bit vector 1 array (step 636). The processor then copies the content of the GPR0 entries of the GPR into the GPR1 entries by asserting a copy_unconditional signal (step 638).

Once the content of the GPR0 entries have been copied into the GPR1 entries, the IDU begins to dispatch instructions from IBUF1 to the execution units (step 640). Again, the processor does not write back instructions that have passed the write back stage and results from executing the instructions once LLA mode is entered are prevented from being written into the GPR. The processor marks all instructions after the write back stage as dirty by updating the associated dirty_bit vector in the dirty_bit vector 1 array (step 642). All instructions dispatched from IBUF1 by the IDU are dispatched with an associated dirty_bit vector from the dirty_bit vector 1 array, under the LLA mode, which indicates that the instruction should be treated as dirty.

The processor then determines if the LLA mode has been exited (step 644). If at step 644 the LLA mode has not been exited, the IDU determines if all of the instructions have been dispatched from IBUF1 (step 646). If at step 646 all of the instructions have not been dispatched, the operation returns to step 640. If at step 646 all instructions from IBUF1 have been dispatched, the processor waits for the LLA mode to exit (step 648). From steps 630, 644, and 648, when the long-latency miss data is returned to the processor, the processor exits LLA mode. The processor then discards all instructions from IBUF1, GPR1 entries, dirty_bit vector 0 array, and the dirty_bit vector 1 array (step 650), with the operation returning to step 610. The discarded instructions may be prefetched into IBUF0 at a later time when IBUF0 starts draining during normal execution mode. The contents of the GPR1 entries are not allowed to copy back into the GPR0 entries. The contents of the GPR1 entries are only needed to assist prefetching in LLA mode.

Thus, the illustrative embodiments provide for enhancing the execution of independent loads in a processing unit. The illustrative embodiments detect if a long-latency miss associated with a load instruction has been encountered. Responsive to the encounter of the long-latency miss, a load lookahead mode is entered in the processing unit. Responsive to entering the load lookahead mode, each instruction from a first set of instructions is dispatched from a first buffer with an associated vector, wherein the associated vector is within a set of vectors in a first vector array. The illustrative embodiments determine if the first set of instructions from the first buffer have completed execution and, responsive to completed execution of the first set of instructions from the first buffer, copy the set of vectors from the first vector array to a second vector array. Then, the illustrative embodiments dispatch a second set of instructions from a second buffer with an associated vector from the second vector array.

Figure 7A:
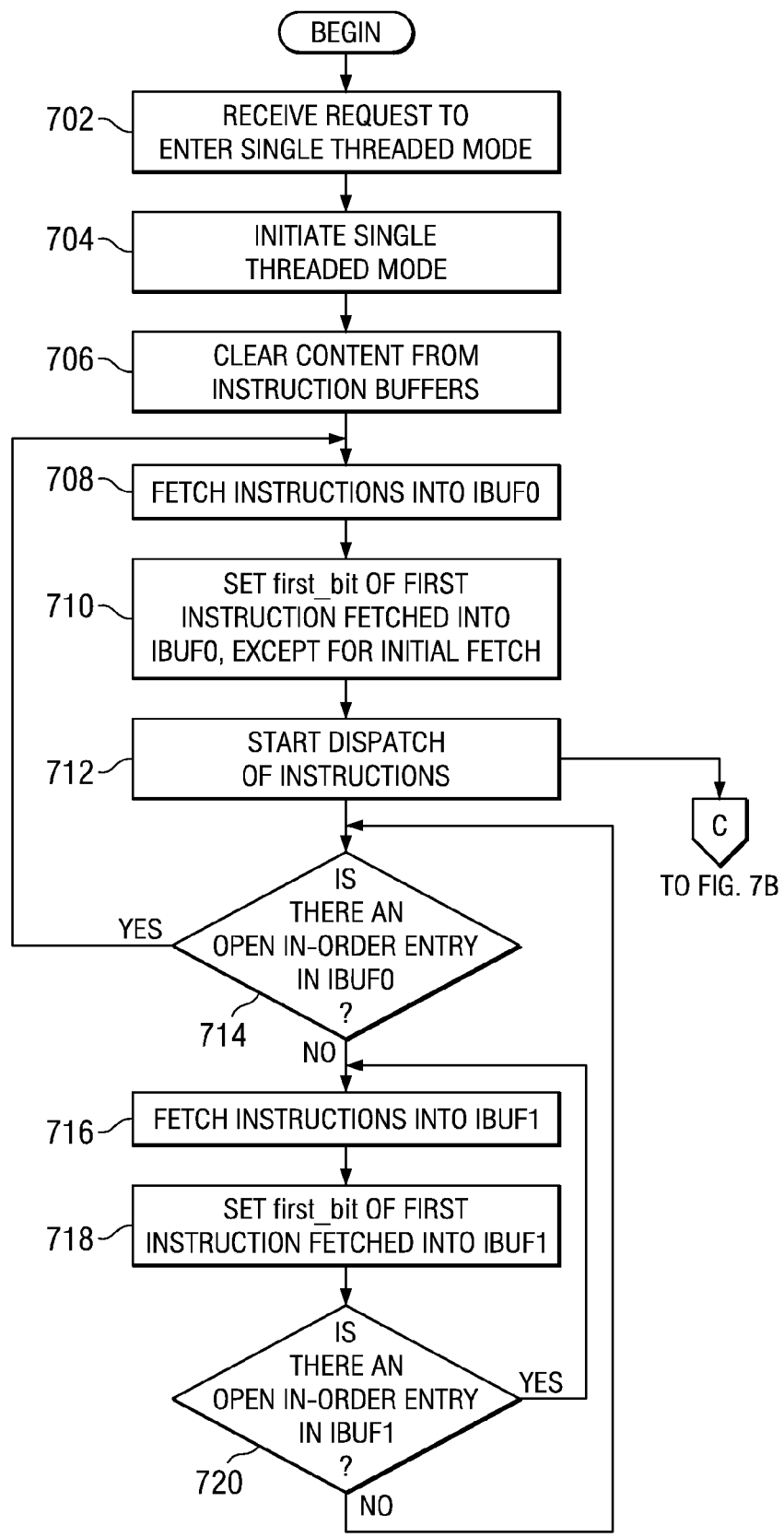
FIGS. 7A, 7B, and 7C depict a flowchart outlining an exemplary operation for a prefetch assist mechanism that enhances the execution of independent loads in a single threaded assist mode without using load lookahead (LLA) in accordance with an illustrative embodiment.
Figure 7B:
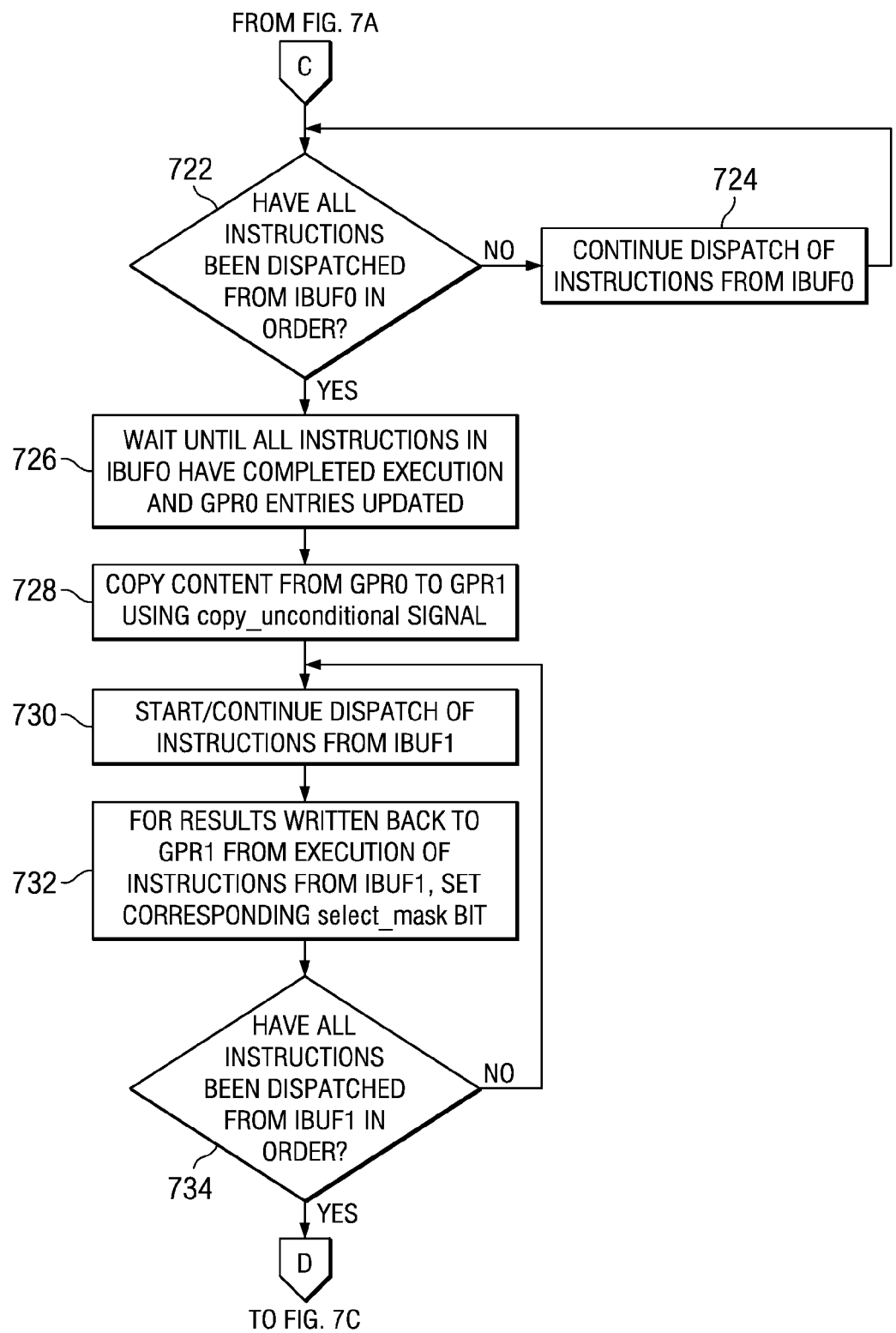
Figure 7C:
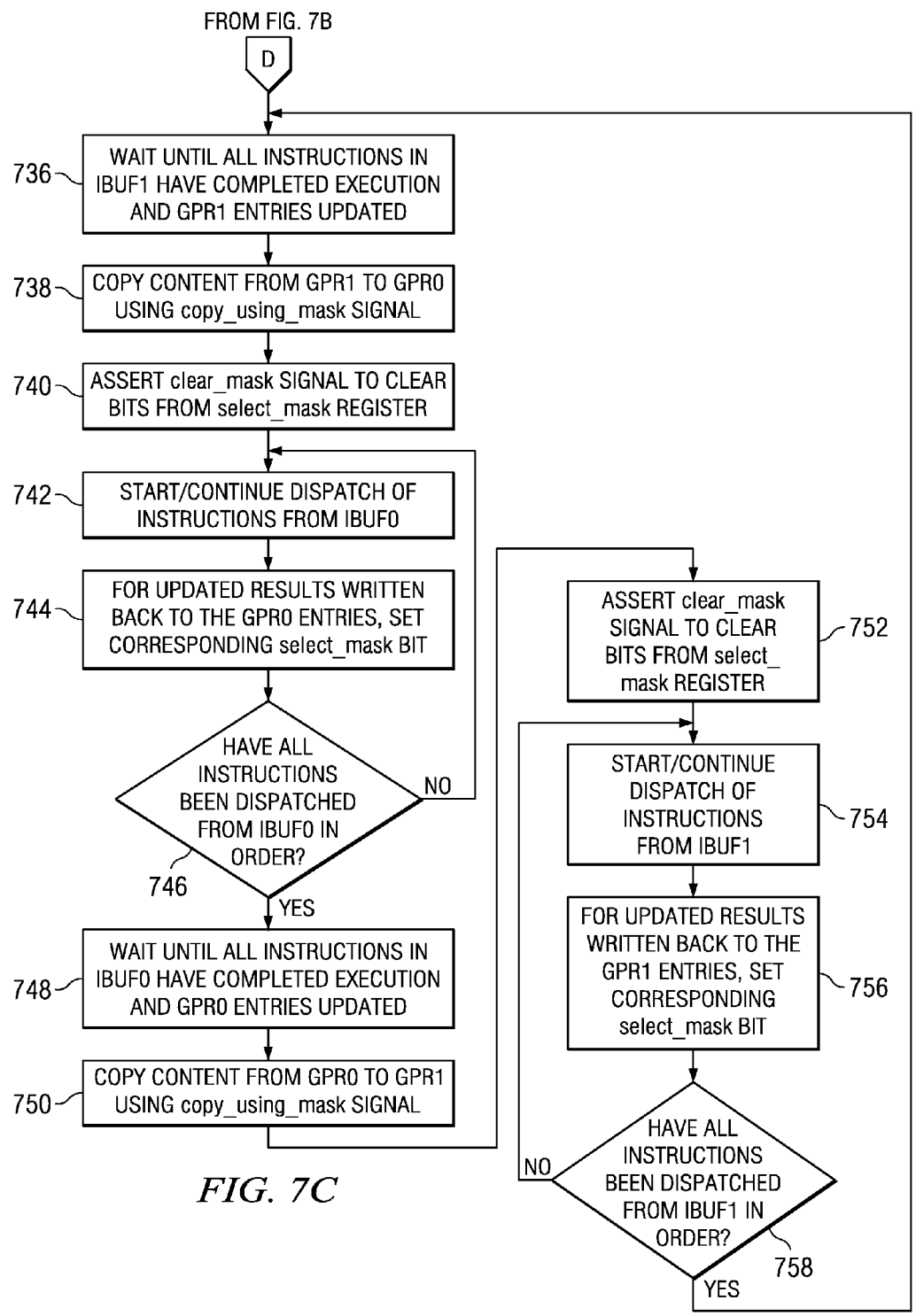

FIGS. 7A, 7B, and 7C depict a flowchart outlining an exemplary operation for a prefetch assist mechanism that enhances the execution of independent loads in a single threaded assist mode without using load lookahead (LLA) in accordance with an illustrative embodiment. The prefetch assist mechanism is implemented in a processor, such as processor 500 of FIG. 5. As the operation begins, the processor receives a request to enter a single threaded mode (step 702). The processor initiates the single threaded mode and behaves accordingly (step 704). At this point the processor clears any content out of the instruction buffers (IBUF), such as IBUF0 502 and IBUF1 504 of FIG. 5 (step 706).

Once in the single threaded mode, an instruction fetch unit (IFU), such as IFU 508 of FIG. 5, fetches instructions from an instruction cache, such as instruction cache 510 of FIG. 5, into IBUF0 (step 708). While not performed for the initial fetch of a first instruction into IBUF0, for subsequent fetches of instructions into IBUF0 control circuitry within IBUF0 sets a first_bit of the first instruction to a 1, which will be described in detail below (step 710). In a normal execution mode, an instruction dispatch unit (IDU), such as IDU 506 of FIG. 5, starts dispatching instructions in order from IBUF0 to execution units, such as execution units 514 of FIG. 5 (step 712). At this point, the operation may perform two simultaneous functions. In the first operation, the IFU determines if there is an open in-order entry in IBUF0 (step 714). If at step 714 IBUF0 is not full, then the operation returns to step 708.

If at step 714 IBUF0 is full, then the instruction decode unit fetches instructions into IBUF1 (step 716). At this point, instructions in IBUF0 are older than instructions in IBUF1. As the instruction decode unit fetches the first instruction to IBUF1 after IBUF0 is full, control circuitry associated with IBUF1 sets a first_bit of the first instruction fetched into IBUF1 to a 1 (step 718). Setting the first_bit of the first instruction to a 1 is performed to indicate that this instruction and any younger instructions in IBUF1 must wait until IBUF0 has dispatched all of its instructions to the execution units. Once the first instruction in IBUF1 is dispatched, the first_bit disappears as the instruction is dispatched to the execution units. Then, the IFU determines if there is an open in-order entry in IBUF1 (step 720). If at step 720 IBUF1 is not full, then the operation returns to step 716. If at step 720 IBUF1 is full, then the operation returns to step 714. That is, when IBUF1 is full and IBUF0 is not full because IBUF0 is being drained by instructions being dispatched by the IDU to the execution units, then the instruction decode unit fetches instructions into IBUF0 and control circuitry within IBUF0 sets the first_bit with the first instruction and instructions in IBUF0 will have to wait until all instructions in IBUF1 have been dispatched.

In the second operation performed from step 712, the IDU determines if all of the instructions have been dispatched from IBUF0 in order (step 722). If from step 722 all of the instructions in IBUF0 have not been dispatched, the IDU continues to dispatch instructions from IBUF0 (step 724), with the operation returning to step 722 thereafter. When the instructions that are dispatched by the IDU from IBUF0 are executed by the executions units, the execution units write the results of the instruction execution into the GPR0 entries of the general purpose register (GPR). If at step 722 all of the instructions have been dispatched from IBUF0, the processor waits until all instructions from IBUF0 have executed and the GPR0 entries are updated (step 726). Then, the processor copies the content of the GPR0 entries into the GPR1 entries by asserting the copy_unconditional signal for one cycle as described with respect to copy_unconditional signal 304 to FIG. 3 (step 728). Once the copy is complete, the IDU begins to dispatch instructions from IBUF1 to the execution units (step 730). The execution units write the results of the instruction execution into the GPR1 entries of the GPR. When updated results are written back to the GPR1 entries, the processor sets the corresponding select_mask bit of a select_mask register, such as select_mask register 310 of FIG. 3, in the GPR using a field, such as a write_back_register_transfer (RT) field or the like, to assert the corresponding set_mask signal, such as set_mask signals 316 of FIG. 3 (step 732). The assertion of one of the set_mask signals is then used to by the processor in setting the corresponding bit in the select_mask register to an active state.

Then, the IDU determines if all of the instructions have been dispatched from IBUF1 in order (step 734). If at step 734 all of the instructions in IBUF1 have not been dispatched, the operation returns to step 730 where the IDU continues to dispatch instructions from IBUF1. If at step 734 all of the instructions have been dispatched from IBUF1, then the processor waits until all instructions from IBUF1 have executed and the GPR1 entries are updated (step 736). Then, the processor copies the content of the GPR1 entries that were updated by the execution of the instructions from IBUF1 to GPR0 entries using the asserted ones of bits in the select_mask register (step 738). The processor copies the updated content from the GPR1 entries to the GPR0 entries by activating a copy_using_mask signal. When the processor asserts the copy_using_mask signal, the processor copies all of the GPR1 entries that have a corresponding select_mask register bit asserted to the corresponding GPR0 entries. Thus, the GPR0 entries now contain all the latest updates from the execution of instructions from IBUF1. Once the content of the GPR1 entries have been copied into the GPR0 entries, the processor asserts a clear_mask signal to clear all of the bits in the select_mask register (step 740).

Then, the IDU begins to dispatch instructions from IBUF0 to the execution units (step 742). The execution units write the results of the instruction execution into the GPR0 entries of the GPR. When updated results are written back to the GPR0 entries, the processor sets the corresponding select_mask bit of a select_mask register as described above (step 744). Then, the IDU determines if all of the instructions have been dispatched from IBUF0 in order (step 746). If at step 746 all of the instructions in IBUF0 have not been dispatched, the operation returns to step 742 where the IDU continues to dispatch instructions from IBUF0. If at step 746 all of the instructions have been dispatched from IBUF0, then the processor waits until all instructions from IBUF0 have executed and the GPR0 entries are updated (step 748). Then, the processor copies the content of the GPR0 entries that were updated by the execution of the instructions from IBUF0 to the GPR1 entries using the asserted ones of bits in the select_mask register (step 750). The processor copies the updated content from the GPR0 entries to the GPR1 entries by activating a copy_using_mask signal. When the processor asserts the copy_using_mask signal, the processor copies all of the GPR0 entries that have a corresponding select_mask register bit asserted to the corresponding GPR1 entries. Thus, the GPR1 entries now contain all the latest updates from the execution of instructions from IBUF0. Once the content of the GPR1 entries have been copied into the GPR0 entries, the processor asserts a clear_mask signal to clear all of the bits in the select_mask register (step 752).

Once the content of the GPR0 entries have been copied into the GPR1 entries, the IDU begins to dispatch instructions from IBUF1 to the execution units (step 754). The execution units write the results of the instruction execution into the GPR1 entries of the GPR. When updated results are written back to the GPR1 entries, the processor sets the corresponding select_mask bit of a select_mask register as described above (step 756). Then, the IDU determines if all of the instructions have been dispatched from IBUF1 in order (step 758). If at step 758 all of the instructions in IBUF1 have not been dispatched, the operation returns to step 754 where the IDU continues to dispatch instructions from IBUF1. If at step 758 all of the instructions have been dispatched from IBUF1, the operation returns to step 736.

Thus, the illustrative embodiments provide for enhancing the execution of independent loads in a processing unit. The illustrative embodiments dispatch a first set of instructions in order from a first buffer for execution. Updates are received from the execution of the first set of instructions and in a first register, at least one register entry associated with each instruction in the first set of instructions is updated with the updated results. The illustrative embodiments determine if the first set of instructions from the first buffer have completed execution and, responsive to the completed execution of the first set of instructions from the first buffer, copy the set of entries from the first register to a second register.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for enhancing the execution of independent loads in a processing unit, the method comprising:
    detecting, by the processing unit, if a long-latency miss associated with a load instruction has been encountered, wherein the processing unit is operating in a single threaded mode;
    responsive to the encounter of the long-latency miss, entering, by the processing unit, a load lookahead mode in the processing unit;
    responsive to entering the load lookahead mode:
        dispatching, by the processing unit, each instruction from a first set of instructions from a first buffer with an associated vector, wherein the associated vector is within a set of vectors in a first vector array;
        fetching, by the processing unit, additional instructions into the first buffer in order until the first buffer is full;
        responsive to filling the first buffer, fetching, by the processing unit, the additional instructions into a second buffer in order until the second buffer is full; and
        responsive to filling the second buffer, stopping, by the processing unit, the fetch of the additional instructions;
    determining, by the processing unit, whether the first set of instructions from the first buffer have completed execution; and
    responsive to completed execution of the first set of instructions from the first buffer:
        copying, by the processing unit, the set of vectors from the first vector array to a second vector array; and
        dispatching, by the processing unit, a second set of instructions from the second buffer with an associated vector from the second vector array.

2. The method of claim 1, wherein the first buffer and the first vector array are associated with a first thread, wherein the second buffer and the second vector array are associated with a second thread, and wherein the first set of instructions and the second set of instructions are associated with the first thread.

3. The method of claim 1, further comprising:
    receiving, by the processing unit, a set of updated results from the execution of the first set of instructions;
    updating, by the processing unit, a register entry within a set of entries in a first register that is associated with each instruction in the first set of instructions;
    responsive to the completed execution of the first set of instructions from the first buffer, copying, by the processing unit, the set of entries from the first register to a second register; and
    updating, by the processing unit, the register entry within the set of entries in the second register that is associated with each executed instruction in the second set of instructions.

4. The method of claim 3, wherein the set of entries from the first register are copied to the second register using a copy_unconditional signal.

5. The method of claim 1, wherein the processing unit executing the single threaded mode comprises:
    determining, by the processing unit, whether a mode bit is set that indicates an initiation of the single threaded mode;
    responsive to the mode bit being set, initiating, by the processing unit, the single threaded mode;
    clearing, by the processing unit, the contents of the first buffer, the second buffer, the first vector array, the second vector array, a first register, and a second register; and
    fetching, by the processing unit, instructions into the first buffer.

6. The method of claim 1, further comprising:
    determining, by the processing unit, whether the load lookahead mode has been exited; and
    responsive to the exit of the load lookahead mode, discarding, by the processing unit, contents of the second buffer, the first vector array, the second vector array, and a second register.

7. A computer program product comprising a non-transitory computer-readable medium having a computer readable program stored therein, wherein the computer readable program, when executed in a data processing system, causes the data processing system to:
    detect if a long-latency miss associated with a load instruction has been encountered by a processing unit, wherein the processing unit is operating in a single threaded mode;
    responsive to the encounter of the long-latency miss, enter a load lookahead mode in the processing unit;
    responsive to entering the load lookahead mode:
        dispatch each instruction from a first set of instructions from a first buffer with an associated vector, wherein the associated vector is within a set of vectors in a first vector array;
        responsive to entering the load lookahead mode, fetch additional instructions into the first buffer in order until the first buffer is full;
        responsive to filling the first buffer, fetch the additional instructions into a second buffer in order until the second buffer is full; and
        responsive to filling the second buffer, stop the fetch of the additional instructions;
    determine whether the first set of instructions from the first buffer have completed execution; and
    responsive to completed execution of the first set of instructions from the first buffer:
        copy the set of vectors from the first vector array to a second vector array; and
        dispatch a second set of instructions from the second buffer with an associated vector from the second vector array.

8. The computer program product of claim 7, wherein the first buffer and the first vector array are associated with a first thread, wherein the second buffer and the second vector array are associated with a second thread, and wherein the first set of instructions and the second set of instructions are associated with the first thread.

9. The computer program product of claim 7, wherein the computer readable program further causes the data processing system to:
  receive a set of updated results from the execution of the first set of instructions;
  update a register entry within a set of entries in a first register that is associated with each instruction in the first set of instructions;
  responsive to the completed execution of the first set of instructions from the first buffer, copy the set of entries from the first register to a second register; and
  update the register entry within the set of entries in the second register that is associated with each executed instruction in the second set of instructions.

10. The computer program product of claim 9, wherein the set of entries from the first register are copied to the second register using a copy_unconditional signal.

11. The computer program product of claim 7, wherein the computer readable program further causes the data processing system to:
  determine whether the load lookahead mode has been exited; and
  responsive to the exit of the load lookahead mode, discard contents of the second buffer, the first vector array, the second vector array, and a second register.

12. The computer program product of claim 7, wherein the data processing system executing the computer readable program for the single threaded mode further cause the data processing system to:
  determine whether a mode bit is set that indicates an initiation of the single threaded mode;
  responsive to the mode bit being set, initiate the single threaded mode;
  clear the contents of the first buffer, the second buffer, the first vector array, the second vector array, a first register, and a second register; and
  fetch instructions into the first buffer.

13. A system, comprising:
  a processing unit; and
  a memory coupled to the processing unit, wherein the memory comprises instructions which, when executed by the processing unit, cause the processing unit to:
  detect if a long-latency miss associated with a load instruction has been encountered, wherein the processing unit is operating in a single threaded mode;
  responsive to the encounter of the long-latency miss, enter a load lookahead mode in the processing unit;
  responsive to entering the load lookahead mode:
    dispatch each instruction from a first set of instructions from a first buffer with an associated vector, wherein the associated vector is within a set of vectors in a first vector array;
    fetch additional instructions into the first buffer in order until the first buffer is full;
    responsive to filling the first buffer, fetch the additional instructions into a second buffer in order until the second buffer is full; and
    responsive to filling the second buffer, stop the fetch of the additional instructions;
  determine whether the first set of instructions from the first buffer have completed execution; and
  responsive to completed execution of the first set of instructions from the first buffer:
    copy the set of vectors from the first vector array to a second vector array; and
    dispatch a second set of instructions from the second buffer with an associated vector from the second vector array.

14. The system of claim 13, wherein the first buffer and the first vector array are associated with a first thread, wherein the second buffer and the second vector array are associated with a second thread, and wherein the first set of instructions and the second set of instructions are associated with the first thread.

15. The system of claim 13, wherein the instructions further cause the processor to:
  receive a set of updated results from the execution of the first set of instructions;
  update a register entry within a set of entries in a first register that is associated with each instruction in the first set of instructions;
  responsive to the completed execution of the first set of instructions from the first buffer, copy the set of entries from the first register to a second register; and
  update the register entry within the set of entries in the second register that is associated with each executed instruction in the second set of instructions.

16. The system of claim 15, wherein the set of entries from the first register are copied to the second register using a copy_unconditional signal.

17. The system of claim 13, wherein the processing unit executing the instructions for the single threaded mode further cause the processor to:
  determine whether a mode bit is set that indicates an initiation of the single threaded mode;
  responsive to the mode bit being set, initiate the single threaded mode;
  clear the contents of the first buffer, the second buffer, the first vector array, the second vector array, a first register, and a second register; and
  fetch instructions into the first buffer.

18. The system of claim 13, wherein the instructions further cause the processor to:
  determine whether the load lookahead mode has been exited; and
  responsive to the exit of the load lookahead mode, discard contents of the second buffer, the first vector array, the second vector array, and a second register.

* * * * *